United States Patent [19]
Davison

[11] Patent Number: 6,155,153
[45] Date of Patent: Dec. 5, 2000

[54] APPARATUS FOR STACKING EGG CARRIERS

[76] Inventor: Stephen Robert James Davison, 108 Ballygarvey Road, Ballymena BT43 7JX, County Antrim, Northern Ireland, United Kingdom

[21] Appl. No.: 09/253,754

[22] Filed: Feb. 22, 1999

[30] Foreign Application Priority Data

Feb. 20, 1998 [GB] United Kingdom ............... 9803635

[51] Int. Cl.⁷ ........................................... B65G 57/20
[52] U.S. Cl. .............................. 83/425; 83/86; 83/563; 414/792.2; 414/793.7
[58] Field of Search ............................. 83/86, 425, 426, 83/563, 564; 414/790.3, 792.2, 793.7

[56] References Cited

U.S. PATENT DOCUMENTS

| 4,765,487 | 8/1988 | Bliss | 414/792.2 X |
| 4,997,339 | 3/1991 | Antonis | 414/793.7 X |

FOREIGN PATENT DOCUMENTS

| 0 255 199 | 2/1988 | European Pat. Off. |
| 0 386 347 | 9/1990 | European Pat. Off. |
| 2 051 722 | 1/1981 | United Kingdom |

*Primary Examiner*—Janice L. Krizek
*Attorney, Agent, or Firm*—Ronald E. Greigg; Edwin E. Greigg

[57] ABSTRACT

Apparatus for stacking egg carriers comprises in linear disposition a carrier delivery conveyor feeding onto a loading station. A transfer arrangement is provided to lift a load from the loading station, displace it linearly and deposit it on a stacking station. A discharge conveyor feeds from the stacking station and a transfer device is provided to move a load or a layered plurality of loads, from the stacking station onto the discharge conveyor. A motive power source is provided and an actuating mechanism operable at the loading station to operate the power source to provide movement of the transfer arrangement and periodically movement of the transfer device.

21 Claims, 5 Drawing Sheets

APPARATUS FOR STACKING EGG CARRIERS

This invention relates to an apparatus for stacking filled egg carriers of substantial rigidity be they in the form of a double 6 pack carton with each pack filled with six eggs or a carton filled with 10/12 or 15/18 eggs or open trays filled with a greater number of eggs. Open trays, while they are of the same or substantially the same areal dimensions, may be provided with up to 30 egg pockets, the number of egg pockets provided varying depending on the size of eggs to be packed.

The prior art discloses many types of stacking device which could be used in egg packing stations, for example, GB 1,596,169 there is described a machine for stacking both cartons and trays, with facilities for orienting the latter by rotation, and thereafter lowering the stacks vertically downwards into a packing case. Or as in GB 2,051,722 where the cartons or trays are conveyor-fed to be stacked on an elevator platform which operates within an egg packing case itself, because the latter is manufactured with a loose bottom, and is indexed to descend towards a roller conveyor where the case, with its bottom now in place, can be pushed toward a delivery section of the egg packing station. Or again, as in EP 255.199, where boxes or trays of eggs are conveyed within the machine and stacked in three layers and oriented within layers at 90° and thereafter placed on a plastic strip which acts as a sling to lower the stacks into a case but which can easily be slipped out again for re-use in lowering further three packs into the case. Or finally, as in EP 386.347 where the trays are alternate layer rotated through 90° and then automatically stacked and moved on conveyor to a fixed stop where they are manually removed un-cased. The disadvantages of the various stacking and packing devices of the prior art lie in the fact that many are only capable of handling the flat open trays whereas others can handle the trays and 12 egg cartons but not double six pack cartons.

In an egg packing station, there is a need for a stacking and packing apparatus which can handle all three types of carrier and such an apparatus is the object of the present invention.

Accordingly, apparatus for stacking egg carriers comprises in linear disposition a carrier delivery conveyor feeding onto a loading station, a transfer arrangement to lift a load from the loading station, displace it linearly and deposit it on a stacking station, a discharge conveyor, transfer means to move a load or a layered plurality of loads from the stacking station on to the discharge conveyor, power means, and actuating means operable at the loading station to operate the power means to provide movement of the transfer arrangement and periodically movement of the transfer means.

Preferably, the stacking station is a platform mounted on an upright shaft and capable of being rotated and indexing means provided to rotate the shaft through a restricted 90° arcuate movement whereby alternate layers of loads can be alternately oriented through 90° each indexing movement being achieved between successive loads being located on the platform. The index movement is beneficially obtained through extension and retraction of a ram of a first ram and cylinder arrangement.

Preferably also, the loading station is of lesser length than the length of a load. The actuating means is preferably an upright trip plate provided at the rear of and standing proud of the loading station whereby it is abutted when a load is fully positioned on the loading station.

A load may comprise a open tray, two 15/18 egg cartons, or three 10/12 egg or double 6 pack egg cartons, the length dimensions across the two 15/18 egg cartons or the three 10/12 egg cartons or double 6 pack egg cartons being equivalent or substantially so to an open tray.

The apparatus for stacking egg carriers may include means for inclining each pack of a double 6 pack, the means having one or two members movable between a rest position and a raised operating position whereat to cause the packs to peak along the mid-way line between the two packs.

Preferably further, the delivery conveyor and loading station are split into three to provide channels therebetween into which the inclining means in the form of two bars are housed to be actuated upwardly when double 6 pack egg cartons are being used, the actuation being to cause the bars to stand proud of the loading station's surface and grip the inside pockets of each pack to cause each pack of the double 6 pack to incline whereby the packs form a peak at the mid-way line. The bars preferably in their upward movement move closer toegether to accommodate the decrease in width between the inside pockets as the peak is formed. A rotary saw is beneficially provided to saw through a double 6 pack to form two separate 6 packs prior to the double pack being fed on to the loading station.

The transfer arrangement is preferably two laterally spaced endless chains each arranged around four sprocket wheels in a rectangular disposition with synchronised movement, the chains having load lifters similarly spaced therearound to grip a load from the loading station and deliver it to the stacking station. Each load lifter has desirably an arm receiving mechanism which has a spring-loaded locking pin with each arm receiving mechanism being hinged to the load lifter. Each arm is beneficially of general trapezoidal shape with the smaller parallel side for fitment to the arm receiving mechanism with the locking pin engagable in an aperture in the arm and the larger parallel side having load gripping means.

The transfer means is preferably an upright square plate movable across the platform on extension of a ram of a second ram and cylinder arrangement.

An embodiment of the present invention will now be described, by way of example, with reference to the accompanying drawings, in which.

Figure 3:
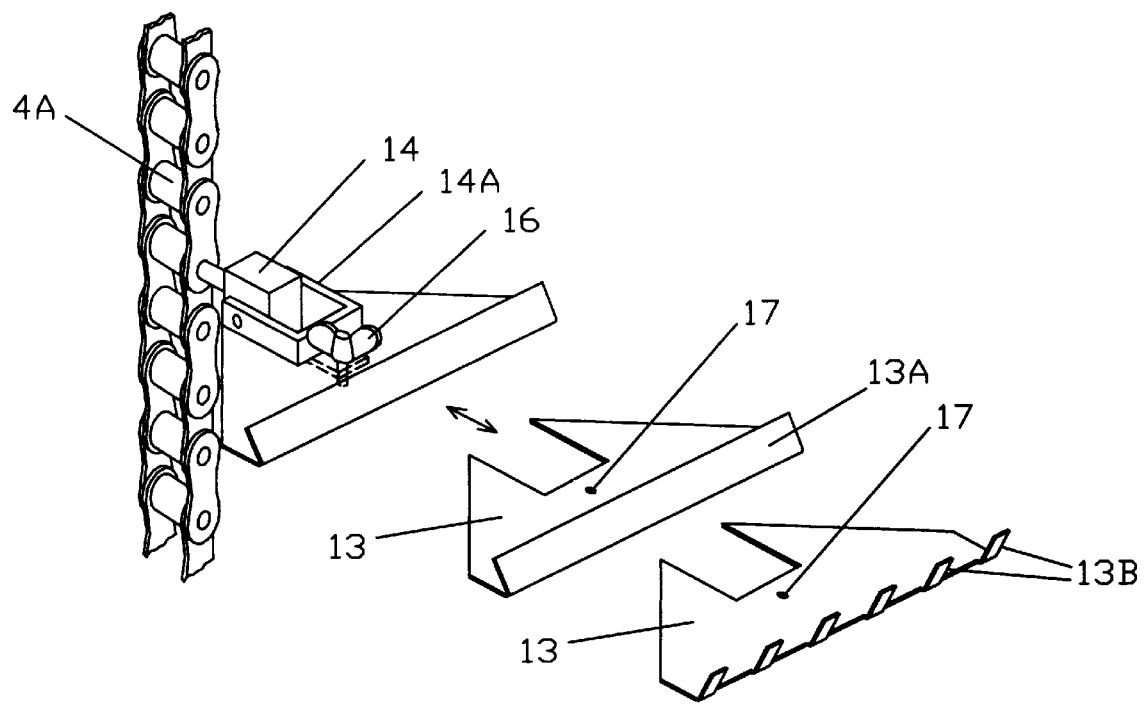
Figure 4:
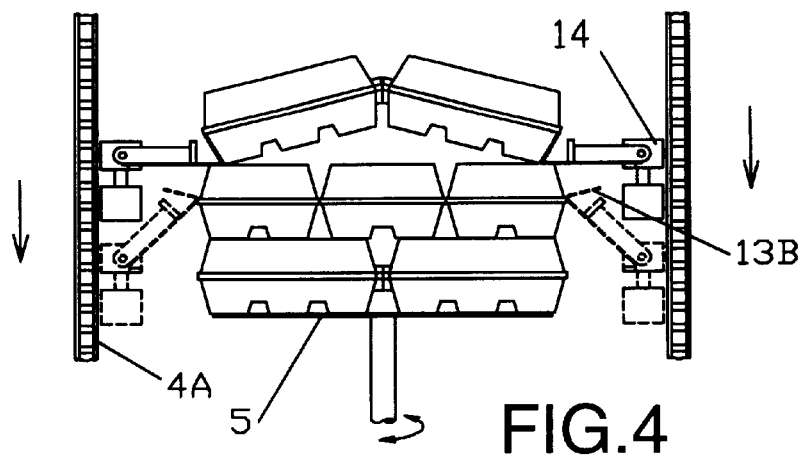
Figure 5:
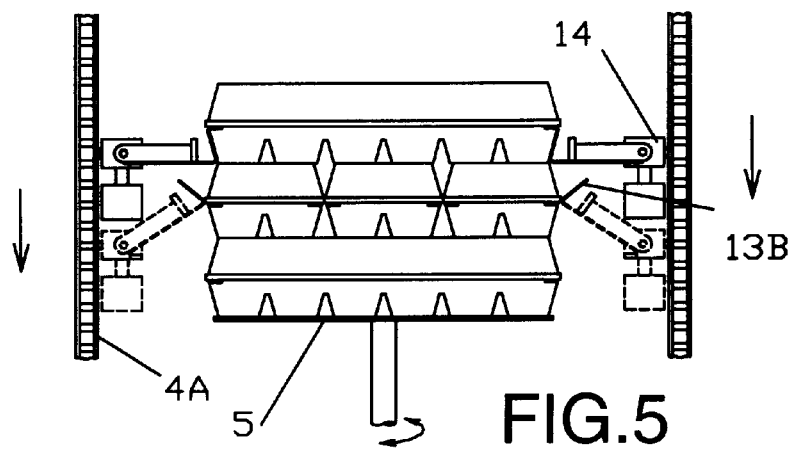
Figure 6:
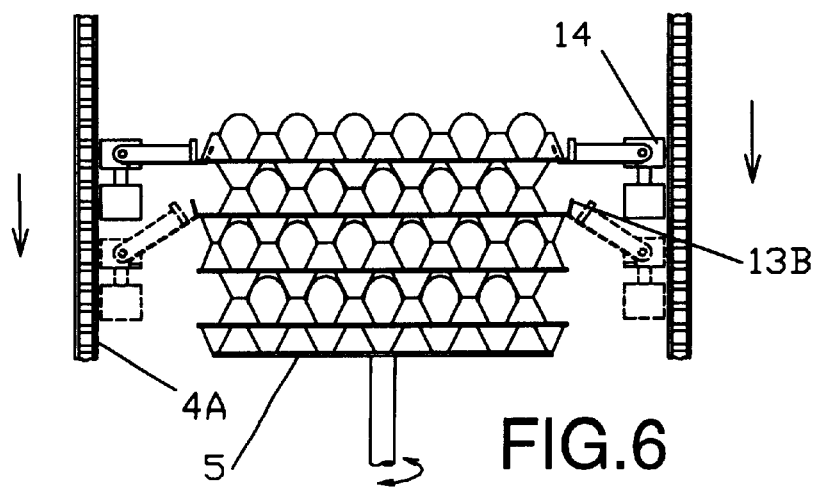

FIG. 3 shows a perspective view of a detail of a transfer arrangement showing an arm receiving mechanism with an arm in position and removed from its position together with a second form of an arm; and FIGS. 4, 5 and 6 show similar end elevations of a three layer stack of carriers on a stacking station, the layers being oriented alternately through 90° and respectively showing the carriers in the form of double 6 packs; 12 packs, and open trays.

Referring to the drawings, apparatus for stacking egg carriers comprises in linear disposition mounted on a framework 9, a carrier delivery conveyor 3 feeding onto a loading station 3A, a transfer arrangement 4 to lift a load 20 from the loading station 3A, displace it linearly and deposit it on a stacking station 5 and a discharge conveyor 10.

The loading station 3A is stationary and is of lesser length than the length of a load 20. A load 20 comprises a open tray, two 18 egg cartons, or three 12 egg or double 6 pack egg cartons, the width dimensions of the two 18 egg cartons or the three 12 egg or double 6 pack egg cartons being equivalent or substantially so to an open tray.

Means to incline each pack of a double 6 pack carton includes having two members movable between a rest position and a raised operating position whereat to cause the packs to peak along the mid-way line between the two packs.

Figure 1A:
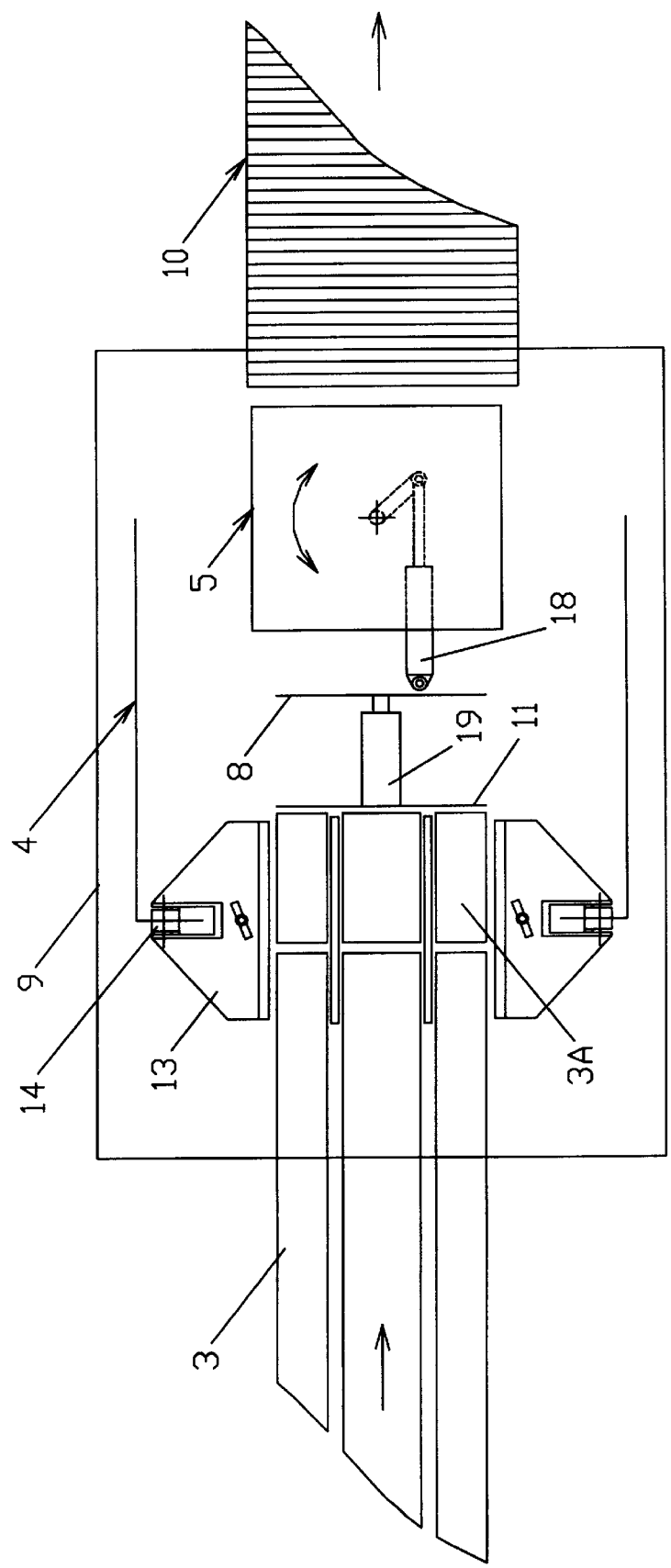
FIG. 1A shows a plan view of a stacking apparatus according to the present invention.
Figure 1B:
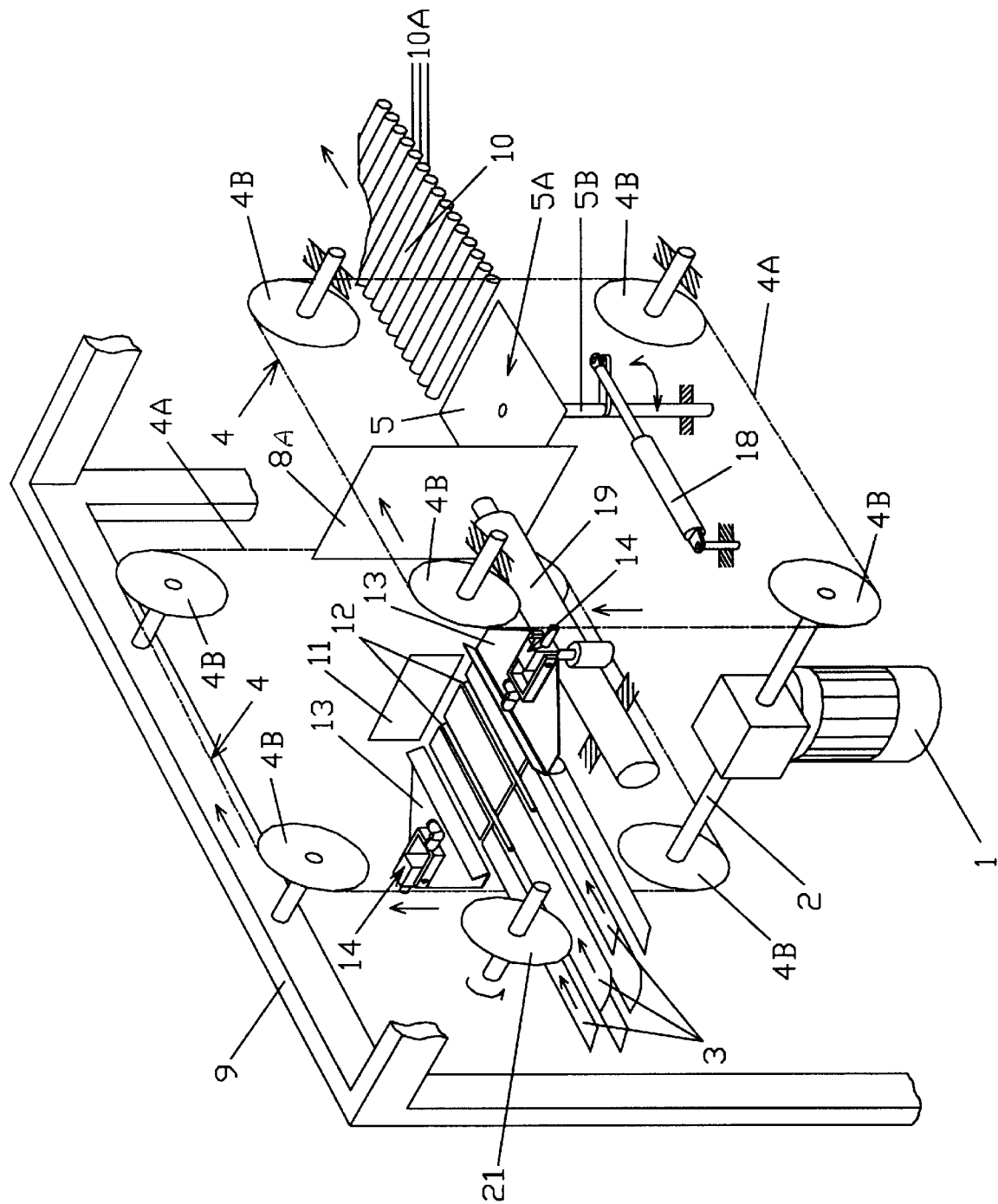
FIG. 1B shows a perspective view of the stacking apparatus with parts cut away for clarity and components shown schematically.
Figure 2:
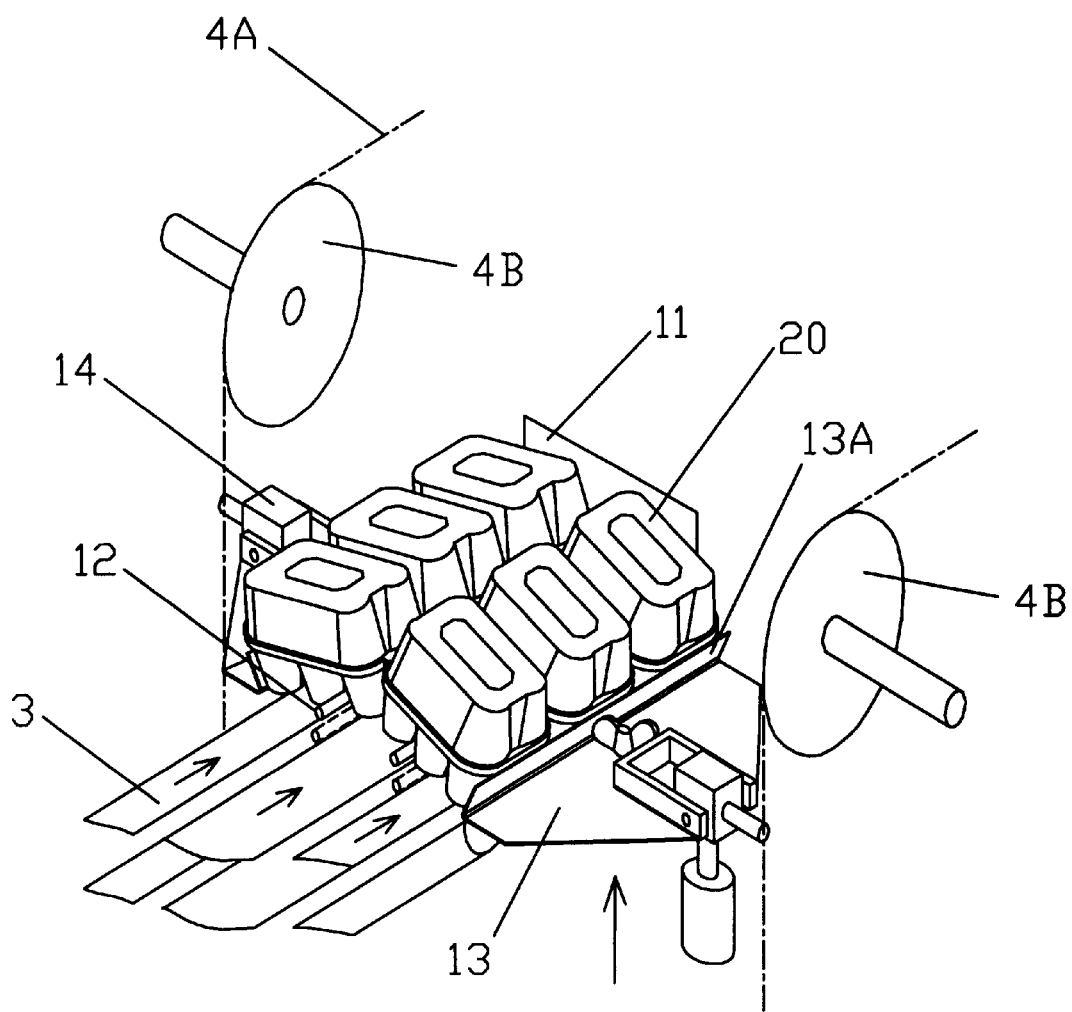
FIG. 2 shows a perspective view of a loading station of the apparatus with three double 6 pack cartons thereon and incline bars raised to peak the packs.

The delivery conveyor 3, in the form of an endless belt conveyor, and the loading station 3A are split into three to provide channels therebetween into which the two members in the form of two incline bars 12 are housed to be actuated upwardly when double 6 pack egg cartons are being used. The actuation of the bars 12 is to cause the bars 12 to stand proud of the loading station's surface and grip the inside pockets of each pack to cause each pack of the double 6 pack to incline as shown in FIG. 2 whereby the packs form a peak at the mid-way line. The bars 12 perform an arcuate movement to accommodate the decrease in width between the inside pockets as the peak is formed.

A rotary saw 21 is provided on a structural member straddling the delivery conveyor 3 to saw through a double 6 pack to form two separate 6 packs prior to the double pack being fed on to the loading station 3A. The saw 21 is movable in its mounting between an in-use position and an out-of-use position.

The transfer arrangement 4 is two laterally spaced endless chains 4A, each arranged around four sprocket wheels 4B in a rectangular disposition with synchronised movement. The chains 4A have one or more pairs of load lifters 14 similarly spaced therearound to grip a load 20 from the loading station 3A and deliver it to the stacking station 5. The load lifters 14 are low friction pivoted to the chains 4A. Each load lifter 14 has an arm receiving mechanism 14A which has a spring-loaded locking pin 16 to secure an arm 13 in the mechanism 14A. Each arm receiving mechanism 14A is hinged to the load lifter 14. Each arm 13 is of general trapezoidal shape with the smaller parallel side for fitment to the arm receiving mechanism 14A with the locking pin 16 engagable in an aperture 17 in the arm 13 and the larger parallel side having load gripping means which is either in the form of a plate gripper 13A or a series of finger grippers 13B.

The stacking station 5 is a platform 5A mounted on an upright shaft 5B and capable of being rotated. Indexing means is provided to rotate the shaft 5B through a restricted 90° arcuate movement whereby alternate layers of loads 20 can be alternately oriented through 90°. Each indexing movement is achieved between successive loads 20 being located on the platform 5A. The index movement is obtained through extension and retraction of a ram of a first ram and cylinder arrangement 18.

Transfer means 8 is provided to move a load 20 or a layered plurality of loads from the stacking station 5 onto the discharge conveyor 10. The transfer means is an upright square plate 8A movable across the platform 5A on extension of a ram of a second ram and cylinder arrangement 19. The discharge conveyor 10 is formed by a bed of low friction rotatable rollers 10A.

Power means in the form of an electric motor 1 and gearing, and actuating means are provided, the actuating means operable at the loading station 3A to operate the power means to provide movement of the transfer arrangement 4 and periodically movement of the transfer means 8. The actuating means is an upright trip plate 11 provided at the rear of and standing proud of the loading station 3A whereby it is abutted when a load 20 is fully positioned on the loading station 3A.

In use, an egg tray is progressed along the delivery conveyor 3 by rotation of the belt and deposited onto the loading station 3A. As soon as the tray abuts the trip plate 11, the chains 4A of the transfer arrangement move and the arms 13 of an opposed set of load lifters 14 engage the tray, and keeping it horizontal, convey it upwards, linearly of the framework 9 and deposit it downwardly on top of the stacking station 5 or onto a tray already on the stacking station 5. The arms 13 fold upwardly as the load lifters pass a tray already on the stacking station so as not to damage the tray and thereafter return to their normal position. The arms 13 in this case have plate grippers 13B. Each successive tray being laid on the stacking station 5 is oriented through 90° relative to its immediate predecessor. This occuring with the platform 5A being rotated through 90° after each tray is laid on the stacking station. After the required number of trays are stacked, the transfer means is energised to move the stack of trays onto the discharge conveyor 10. Alternately in use, three 12 packs cartons are separately fed along the delivery conveyor to the loading station 3A. The first carton sits at the front of the station 3A where it is fed by the conveyor. The next carton replaces it and moves the first carton further onto the station, and the third carton similarly moves the other two further onto the station and in so doing, causes the leading edge of the first carton to abut the trip plate 11. The arms in this use are those with gripper fingers 13A. In a third use, the cartons are double 6 pack cartons. After the three cartons are on the loading station, the bars 12 are extended to incline the packs. The arms with gripper fingers engage the three cartons and maintain their inclined attitude during a transfer operation to the stacking station whereat when laid on top of the station they resume their non-inclined attitude as shown in the drawings. It has been found that even with the double 6 pack cartons cut, it is still possible to transfer them in the inclined attitude.

The loads may be of two 15 egg cartons or three 10 egg cartons, the length dimension being the same as for the two 18 egg carton or the three 12 egg carton. It is not essential that the alternate layers be rotated, particularly in connection with the 15 or 10 egg cartons.

While only one pair of load lifters are shown, two or three pairs of load lifters may be used.

In a modification, the means for inclining each pack of a double 6 pack carton may alternatively comprise two incline members in the form of plates normally resting on the loading station, the plates being adapted to peak at their inner sides to cause each pack of the double 6 pack to incline whereby the packs form the peak at the mid-way line.

In a second modification, only one incline member in the form of either a bar or a plate may be provided.

A benefit of the present invention is to provide stacks of egg carriers suitable for a packing case, be it a single stack case or a double stack case, the case with open bottom flaps being slipped over the stack(s) on the discharge conveyor. Thereafter, the flaps at the bottom and top of the case being closed over and the case sealed.

The foregoing relates to preferred exemplary embodiments of the invention, it being understood that other variants and embodiments thereof are possible within the spirit and scope of the invention, the latter being defined by the appended claims.

What is claimed is:

1. Apparatus for stacking egg carriers comprising in linear disposition a carrier delivery conveyor feeding onto a loading station, a transfer arrangement to lift a load from the loading station, displace the load linearly and deposit the load on a stacking station, the transfer arrangement including one or more pairs of load lifters, each load lifter having an arm receiving mechanism which has a locking pin with each arm receiving mechanism being hinged to the load lifter, a discharge conveyor, transfer means to move a load or a layered plurality of loads from the stacking station onto the discharge conveyor, power means, and actuating means operable at the loading station to operate the power means to provide movement of the transfer arrangement and periodically movement of the transfer means.

2. Apparatus according to claim 1, wherein the loading station is of lesser length than a length of a load.

3. Apparatus according to claim 1, wherein the actuating means is an upright trip plate provided at a rear of and adjacent to the loading station to which the actuating means is abutted when a load is fully positioned on the loading station.

4. Apparatus according to claim 1, wherein the transfer arrangement is two laterally spaced endless chains, each arranged around four sprocket wheels in a rectangular disposition with synchronized movement, the chains having the one or more pairs of load lifters similarly spaced therearound to grip a load from the loading station and deliver the load to the stacking station.

5. Apparatus according to claim 4, wherein the locking pin on each arm receiving mechanism is spring-loaded.

6. Apparatus according to claim 5, wherein each load lifter has an arm mounted thereto, each arm is of generally trapezoidal shape with a smaller parallel side for fitment to the arm receiving mechanism with the locking pin adapted to engage in an aperture in the arm and a larger parallel side having load gripping means.

7. Apparatus according to claim 1, wherein the stacking station is a platform mounted on an upright shaft and capable of being rotated, and indexing means provided to rotate the shaft through a restricted 90° arcuate movement whereby alternate layers of loads are alternately oriented through 90°, each indexing movement being achieved between successive loads being located on the platform.

8. Apparatus according to claim 7, wherein the loading station is of lesser length than a length of a load.

9. Apparatus according to claim 7, wherein the actuating means is an upright trip plate provided at a rear of and separate from the loading station to which the actuating means is abutted when a load is fully positioned on the loading station.

10. Apparatus according to claim 7, wherein the indexing movement is obtained through extension and retraction of a ram of a first ram and cylinder arrangement.

11. Apparatus according to claim 10, wherein the loading station is of lesser length than a length of a load.

12. Apparatus according to claim 10, wherein the transfer means is an upright square plate movable across the platform on extension of a ram of a second ram and cylinder arrangement.

13. Apparatus according to claim 10, wherein the transfer means is an upright square plate movable across the platform on extension of a ram of a second ram and cylinder arrangement.

14. Apparatus for stacking egg carriers includes means for inclining each pack of a double 6 pack carton, said means having at least one member movable between a rest position and a raised operating position so as to cause the packs to form a peak along a mid-way line between two packs.

15. Apparatus as claimed in claim 14, wherein a delivery conveyor and a loading station are provided and the means for inclining each pack of a double 6 pack carton comprises two incline members in the form of plates normally resting on the loading station, the plates being adapted to peak at their inner sides to cause each pack of the double 6 pack carton to incline, whereby the packs form the peak at the mid-way line therebetween.

16. Apparatus according to claim 14, wherein a delivery conveyor and a loading station are provided and the means for inclining each pack of a double 6 pack carton comprises two incline members in the form of bars normally housed in two corresponding channels provided in the loading station and the delivery conveyor feeding thereonto, the bars being adapted to extend from a housing to grip inside pockets of each pack to cause each pack of the double 6 pack carton to incline, whereby the packs form the peak at the mid-way line.

17. Apparatus as claimed in claim 16, wherein the bars in their upward movement move closer together to accommodate the decrease in distance between the inside pockets as the peak is formed.

18. Apparatus for stacking egg carriers comprising in linear disposition a carrier delivery conveyor feeding onto a loading station, a transfer arrangement to lift an open tray and one of a chosen set of egg cartons from the loading station, said set of egg cartons being selected from the group consisting of two 15/18 egg cartons, three 10/12 egg cartons or double 6 pack egg cartons, the width dimensions of the two 15/18 egg cartons, the three 10/12 egg cartons or the double 6 pack egg cartons being substantially equivalent to an open tray, displace the open tray and one of a chosen set of egg cartons linearly and deposit the open tray and one of a chosen set of egg cartons on a stacking station, a discharge conveyor, transfer means to move said open trays and chosen sets of egg cartons or a layered plurality of open trays and chosen sets of egg cartons from the stacking station onto the discharge conveyor, power means, and actuating means operable at the loading station to operate the power means to provide movement of the transfer arrangement and periodically movement of the transfer means, the delivery conveyor and loading station are comprised of three rail means to provide channels therebetween into which two bars are housed to be actuated upwardly when double six pack egg cartons are being used, said upward actuation being arranged to cause the bars to raise above the loading station's surface so as to grip the inside pockets of each double six pack and cause each double six pack to incline, whereby the packs form a peak at a mid-way line.

19. Apparatus according to claim 18, wherein a rotary saw is provided to saw through a double 6 pack to form two separate 6 packs prior to the double 6 pack being fed onto the loading station.

20. Apparatus according to claim 18, wherein the bars in their upward movement move closer together to accommodate a decrease in distance between the inside pockets as the peak is formed.

21. Apparatus according to claim 20, wherein a rotary saw is provided to saw through a double 6 pack to form two separate 6 packs prior to the double 6 pack being fed onto the loading station.

\* \* \* \* \*